US007546782B2

(12) United States Patent
Adams et al.

(10) Patent No.: US 7,546,782 B2
(45) Date of Patent: Jun. 16, 2009

(54) COOLING BEARINGS, MOTORS AND OTHER ROTATING HEAT GENERATING COMPONENTS

(75) Inventors: John D. Adams, Lusby, MD (US); Shepard W. McKenney, Drayden, MD (US)

(73) Assignee: Seakeeper, Inc., Solomons, MD (US)

( * ) Notice: Subject to any disclaimer, the term of this patent is extended or adjusted under 35 U.S.C. 154(b) by 395 days.

(21) Appl. No.: 11/330,896

(22) Filed: Jan. 12, 2006

(65) Prior Publication Data
US 2007/0157749 A1  Jul. 12, 2007

(51) Int. Cl.
F16C 15/00 (2006.01)
H02K 1/32 (2006.01)
(52) U.S. Cl. .......................................... 74/5.95; 310/64
(58) Field of Classification Search .................. 74/5.22, 74/5.34, 5.37, 5.7, 5.95, 572.1, 572.11; 310/52, 310/55, 64, 65
See application file for complete search history.

(56) References Cited

U.S. PATENT DOCUMENTS

| 2,330,121 | A | * | 9/1943 | Heintz ......................... 310/52 |
| 3,062,507 | A | | 11/1962 | Andrus |
| 3,421,578 | A | * | 1/1969 | Marton ....................... 165/186 |
| 3,706,231 | A | * | 12/1972 | Noar et al. .................... 74/5 R |
| 3,999,400 | A | * | 12/1976 | Gray .......................... 62/115 |
| 4,262,483 | A | * | 4/1981 | DeGeus ..................... 60/641.8 |
| 4,290,316 | A | * | 9/1981 | Noar et al. .................... 74/5.46 |
| 4,569,639 | A | | 2/1986 | Hannibal et al. |
| 6,373,158 | B1 | | 4/2002 | Hsu et al. |
| 6,527,865 | B1 | | 3/2003 | Sajoto et al. |
| 6,664,680 | B1 | | 12/2003 | Gabrys |
| 6,973,847 | B2 | | 12/2005 | Adams et al. |
| 2005/0040776 | A1 | | 2/2005 | Sibley |
| 2005/0271528 | A1 | | 12/2005 | Stones |

* cited by examiner

Primary Examiner—Roger Pang
(74) Attorney, Agent, or Firm—Fish & Richardson P.C.

(57) ABSTRACT

Cooling apparatus for transferring heat from and cooling one or more heat generating components that support or drive a flywheel or other spinning member. The apparatus may include a first heat transfer element attached to and spinning with the spinning member, a second heat transfer element stationary with respect to the spinning member, wherein the first and second heat transfer elements move relative to one another, and wherein the first and second heat transfer elements are shaped and positioned in close proximity to one another so that substantial heat is transferred from the first heat transfer element to the second heat transfer element. Alternatively, the apparatus may include a set of rotating vanes mounted to rotate with the spinning member, an orifice configured to direct a spray of cooling liquid onto the rotating vanes, wherein the cooling liquid is sprayed onto the rotating vanes at a radially inward location, so that the liquid flows radially outward over the surface of the vanes as a thin film of liquid, and is thrown off the vanes by centrifugal action, and collecting apparatus configured to collect the liquid thrown off of the vanes.

23 Claims, 8 Drawing Sheets

COOLING BEARINGS, MOTORS AND OTHER ROTATING HEAT GENERATING COMPONENTS

TECHNICAL FIELD

This invention relates to methods and apparatus for cooling bearings, motors, and other heat generating components that support and drive rotating machinery, e.g., flywheels that are enclosed in a partial vacuum.

BACKGROUND

A control moment gyro ("CMG") used for roll attenuation in boats is dependent on a heavy flywheel operating at high rotational speeds. The spinning flywheel is supported by bearings that are subjected to high axial and radial loads. As a result, these bearings produce a substantial amount of friction-generated heat, which must be dissipated in order to avoid dangerous heat build up. If the flywheel is supported in a conventional, ambient environment, the heat can be dissipated by air convection, which can be assisted by having a fan blow air across the outer and inner bearing races and the adjacent metal members. But if the flywheel is enclosed in a partial vacuum, e.g., as described in our patent, U.S. Pat. No. 6,973,847, there may not be enough air to permit convection. The same cooling problem may exist in other devices in which flywheels spin in partially evacuated enclosures (e.g., mechanical energy storage devices) and manufacturing processes that use evacuated chambers containing spinning elements that require heat generating bearings. At present, flywheel energy storage devices typically use expensive magnetic bearings (which do not generate frictional heat) instead of much less expensive rolling element bearings. One reason is that there are no proven methods of removing the heat from the inner races of rolling element bearings in a partial vacuum except by jetting or circulating cooling oil through the bearings, and this tends to create large power losses.

Two types of heat flow—conduction and convection—need to be distinguished. Heat conduction occurs by molecules bumping into other molecules. Thus, when you place your hand on a warm radiator, the fast moving molecules in the warm metal bump into molecules in your skin, transferring energy to them. Heat convection occurs when molecules are moved as a consequence of air (or other gas or liquid) flowing from one location to another. Thus, the warm radiator heats a room by conduction of heat to air immediately adjacent the surface of the radiator, and then by convection as that warmed air flows around the room. The warmth in the air is transferred to the occupants of the room by conduction, when the molecules in warm air contact the skin or clothing of the person. Heat conduction may occur through a gas, liquid, or solid. When it occurs through a gas, it can be called gaseous conduction. When it occurs through a solid (e.g., through a metal or other good conductor of heat), it can be called solid conduction.

Fourier's law of heat conduction defines one dimensional heat transfer between two parallel surfaces by gaseous conduction:

$$Q = KA \Delta T / \Delta X$$

Where Q=heat transfer (watts)
K=thermal conductivity of the gas (watts/m–Deg C.)
A=area of the parallel surface (m2)
$\Delta T$=temperature differential between the two heat transfer surfaces (deg C.)
$\Delta X$=distance between the heat transfer surfaces (m)

As shown in the equation, the amount of heat transferred is directly proportional to the thermal conductivity of the gas, the area of the surfaces, and the temperature difference between the surfaces, and is inversely proportional to the distance between the surfaces. The thermal conductivity of the gas (K) is constant irrespective of pressure until the pressure is so low that the gas molecular mean free path is equal to or greater than the distance between the surfaces ($\Delta X$). This means that the amount of heat transferred will be independent of pressure until the gas mean free path is equal to or greater than the distance between the surfaces. Below the pressure where the gas molecular mean free path is greater than the distance between the surfaces, the gas molecules will continue to conduct heat but now there is a reduction in the thermal conductivity (and the amount heat transferred) with further reductions in the gas pressure.

SUMMARY

We have discovered practical techniques for transferring heat away from heat generating components, e.g., bearings and motors, that support and drive rotating machinery such as flywheels. Typically, heat will build up on the inner races of the bearings that support the flywheel (but other sources of heat, such as motor heat, air drag or windage are also possible). Such a build up of heat on the inner races can lead to failure of the apparatus, as a large temperature differential can result between the inner and outer bearing races. The outer races typically remain cooler because heat can flow (by conduction through abutting metal members) from the outer races to the exterior of the enclosure, where the heat is dissipated by convection (air passing across the warm exterior surface). Only a small amount of heat is conducted across the bearings (from the inner to outer races), and thus the inner races and the flywheel to which they are attached tend to rise in temperature. The rising temperatures can destroy the effectiveness of bearing lubricant, and can also subject the inner race to thermal expansions not seen by the cooler outer race with resulting catastrophic destruction of the bearings and apparatus.

Known cooling techniques include immersing the bearings in a circulating oil bath or jetting oil through the bearings (as in a gas turbine engine) or pumping a large volume of air/oil mist through the bearings (as in machine tool spindles) to lubricate and cool them. However, these methods are complicated and they tend to increase the heat generated by the bearing as the viscous drag of the rolling elements churning through the oil substantially increases the power required to drive the flywheel or other spinning member. The air/oil mist method is not applicable to vacuum applications as it requires substantial air flow. Some machine tool manufacturers pump water down a hole that is gun drilled through the spindle shaft to remove heat from the bearings and motor. This is also difficult to apply to vacuum applications as the water must be maintained at ambient pressure to prevent it from vaporizing.

In a first aspect, the invention features cooling apparatus for transferring heat from and cooling one or more heat generating components that support or drive a flywheel or other spinning member. The apparatus comprises a first heat transfer element attached to and spinning with the spinning member, a second heat transfer element stationary with respect to the spinning member, wherein the first and second heat transfer elements move relative to one another, and wherein the first and second heat transfer elements are shaped and positioned in close proximity to one another so that substantial heat is transferred from the first heat transfer element to the second heat transfer element. The close proximity of the two surfaces or elements promotes heat transfer by gaseous conduction. The relative rotational movement and close proximity of the elements creates rotating cavity flows that promote heat transfer by gaseous convection. These rotating flows continually circulate air molecules from the hotter first element to the cooler second element.

In preferred implementations, one or more of the following may be incorporated. Heat transfer between the first and second heat transfer elements may occur both by gaseous conduction and convection. Heat transfer between the first and second heat transfer element may be primarily by gaseous conduction. The first and second heat transfer elements may have closely spaced exposed surfaces across which heat is transferred. The first heat transfer element may comprise a plurality of first vanes, the second heat transfer element may comprise a plurality of second vanes, the first vanes may move with respect to the second vanes, the first vanes may extend into gaps between the second vanes so that the first and second vanes are interleaved, and substantial heat may be transferred from the first vanes to the second vanes. An enclosure may surround the spinning member, the first heat transfer element may comprise the outer surface of the spinning member, and the second heat transfer element may comprise the inner surface of the enclosure spaced by a small gap from the spinning member so that substantial heat is transferred by gaseous conduction from the spinning member to the enclosure. The separation between the first vanes and second vanes may be greater than 0.025 mm but less than 10 mm. The spinning member may be enclosed within an enclosure containing a gas at below-ambient pressure or below-ambient density, the first heat transfer element and first vanes may spin relative to the enclosure, the second heat transfer element and second vanes may be fixed relative to the enclosure, and the second heat transfer element may be positioned so that heat can be readily transferred from the second heat transfer element to the exterior of the enclosure. The gas may be both below-ambient pressure and below-ambient density. The axis of rotation about which the spinning member spins may define an axial direction, the first vanes may be cylindrical elements extending in a first axial direction from a first base attached to the spinning member, the second vanes may be cylindrical elements extending in a second axial direction, opposite the first axial direction, from a second base attached to the enclosure, and the gaps between the second vanes may be cylindrical channels shaped and positioned to receive the cylindrical first vanes. The axis of rotation about which the spinning member spins may define an axial direction, the first and second vanes may be planar elements extending in radial directions perpendicularly to the axial direction, and the gaps between the second vanes may be planar channels shaped and positioned to receive the planar first vanes. The first and second heat transfer elements may be located adjacent a bearing that supports the spinning member, the bearing may have an inner race and an outer race, the first vanes and inner race may be attached to the spinning member so heat flows by conduction from the inner race to the first vanes and from the spinning member to the first vanes, the outer race may be attached to the enclosure, and the inner race, spinning member, first vanes and second vanes may be sized and positioned so that heat from the inner race of the bearing flows by solid conduction from the inner race to the spinning member and to the first vanes, by solid conduction from the spinning member to the first vanes, and by gaseous conduction and convection from the first vanes to the second vanes, and by solid conduction from the second vanes to the exterior of the enclosure. The apparatus may comprise at least two bearings, each with its own first and second heat transfer elements as described.

The spinning member may be a flywheel and the flywheel and enclosure may be part of gyroscopic roll stabilizer for a boat. The invention may further comprise a heat sink to which heat flows from the second vanes. The heat sink may comprise air-cooled fins on the exterior of the enclosure. The gas between the first and second transfer elements may have a molecular mean free path equal to or less than the distance between the heat transfer elements. The invention may further comprise a plurality of sets of first and second vanes. The gas may have a higher thermal conductivity than air. The heat generating component may comprise one or more bearings. The heat generating component may comprise one or more electrical motors.

The gap between the hotter rotating vanes and the cooler non-rotating vanes may be kept very small, and thus provide a heat path to the exterior of the device as long as the rotating vanes are hotter than the stationary vanes. Heat may be conducted from the heat generating components to the rotating vanes by solid conduction, then across the air gap to the stationary vanes by gaseous conduction and convection and then by conduction and convection to the atmosphere or a heat sink.

This first aspect of the invention has significant advantages. For example, as applied to ambient and above ambient pressure conditions, it does not require pumping large volumes of air or cooling fluid to cool the heat generating components. However, even greater advantages are found at below ambient pressure, wherein convective cooling with air becomes more difficult because of the reduced pressure, and radiant heat transfer may be negligible because the temperature differentials may not be large enough to transfer a significant amount of heat. Reliance on gaseous conduction benefits from the fact that the thermal conductivity of a gas increases with temperature so that as the gas warms up it will conduct more heat across the gap (for a fixed temperature differential) between the rotating and stationary vanes. This helps stabilize thermal behavior.

Rotating cavity flows will exist in the small gaps between the fixed and rotating vanes even in a partial vacuum. In some applications, the gas density and/or rotational speed will be high enough that gaseous convection will augment the gaseous conduction cooling. The rotating flow circulates the gas molecules so they are continuously transported from the hot rotating vanes to the cooler stationary vanes.

The first aspect permits heat to be removed passively without circulating any fluids inside the enclosure. This considerably simplifies the device or machine, as a coolant pump, motor, filter and heat exchanger are not required. Grease lubricated bearings can be used and these will have less frictional torque than oil lubricated bearings.

In a second aspect, the invention features cooling apparatus for transferring heat from and cooling one or more heat generating components that support or drive a flywheel or other spinning member. The apparatus comprises a set of rotating vanes mounted to rotate with the spinning member, an orifice configured to direct a spray of cooling liquid onto the rotating vanes, wherein the cooling liquid is sprayed onto the rotating vanes at a radially inward location, so that the liquid flows radially outward over the surface of the vanes as a thin film of liquid, and is thrown off the vanes by centrifugal action; and collecting apparatus configured to collect the liquid thrown off of the vanes.

Preferred implementations of this aspect of the invention may incorporate one or more of the following. The invention may further comprise cooling apparatus configured to cool the liquid collected by the collecting apparatus, and wherein the cooled liquid may be returned to the orifice. There may be a plurality of sprays of cooling liquid, each stream may be narrower than the gap between the rotating vanes, and each stream may be directed so that it generally travels between the vanes to the radially inward location. The cooling liquid may be an oil. The spinning member may be enclosed within an enclosure containing a gas at below-ambient pressure or below-ambient density, the rotating vanes may rotate with the spinning member within the enclosure, and the orifice may be fixed relative to the enclosure. The vapor pressure of the cooling liquid may be lower than the operating pressure of the gas within the enclosure. There may be a plurality of sets of rotating vanes. The oil used for cooling may also be used for lubrication of at least one bearing.

The liquid cooling aspect of the invention has significant advantages. For example, the cooler liquid film moving at high speed across the hotter surface of the rotating vanes makes for a very efficient heat exchanger. The oil exiting the vanes can be readily collected and cooled, either passively or actively, and then returned to the orifice to be sprayed on the vanes again.

For very high-speed flywheel bearings, oil lubrication is mandatory and in this case the liquid cooling scheme has an advantage, as oil can be used for cooling and lubricating the bearings. The amount of oil required to lubricate the bearings is very small. Therefore, jetting the oil onto the rotating vanes for cooling requires far less power than jetting or circulating the oil through the bearings as in traditional bearing cooling schemes.

Both the first and second aspects of the invention overcome the problem of cooling rotating components that generate heat and are enclosed in a partial vacuum. They both will permit the development of control moment gyros (CMGs) for stabilizing small boats and the development of flywheel energy storage devices that use rolling element bearings, as now there is a way of removing the heat from these rotating components that does not increase operating power requirements. Additionally, the invention may assist in cooling the inner races of bearings, motors and other rotating heat generating components that operate in confined spaces at ambient or above ambient pressure (e.g. machine tool spindles).

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
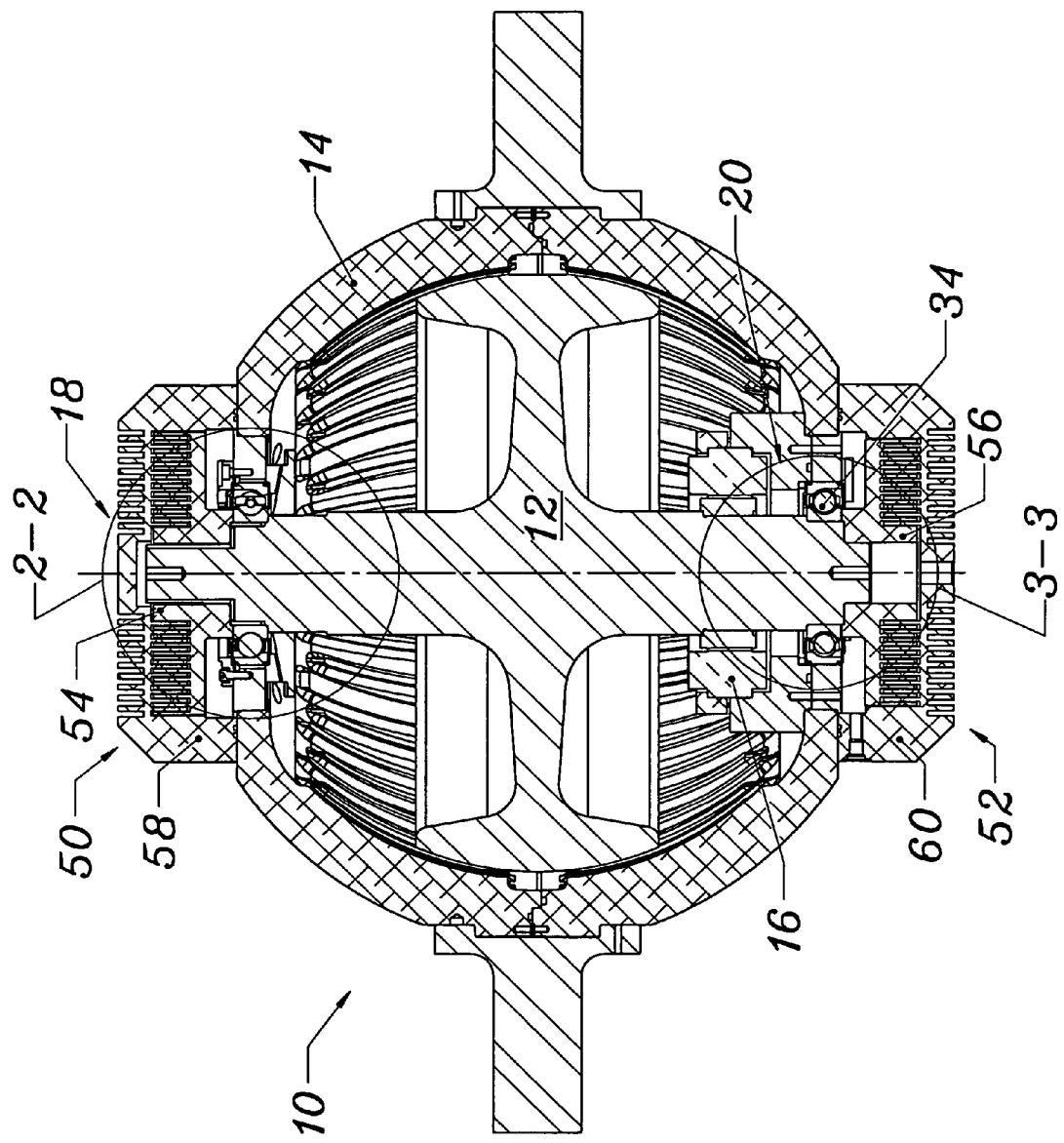
FIG. 1 is a cross-sectional view of a boat stability CMG incorporating an implementation of the first aspect of the invention.

Shown in FIG. 1 is a gyroscopic roll stabilizer 10 for small boats (of the type described in U.S. Pat. No. 6,973,847, incorporated herein by reference). A steel flywheel 12 spins within an aluminum enclosure 14, which is evacuated to a below-ambient pressure, and may include a below-ambient density gas (e.g., helium or hydrogen) to reduce friction on the spinning flywheel. An electric motor (frameless DC brushless) 16 integrated within the interior of the enclosure drives the flywheel, which is supported by an upper bearing assembly 18 and lower bearing assembly 20.

Figure 2:
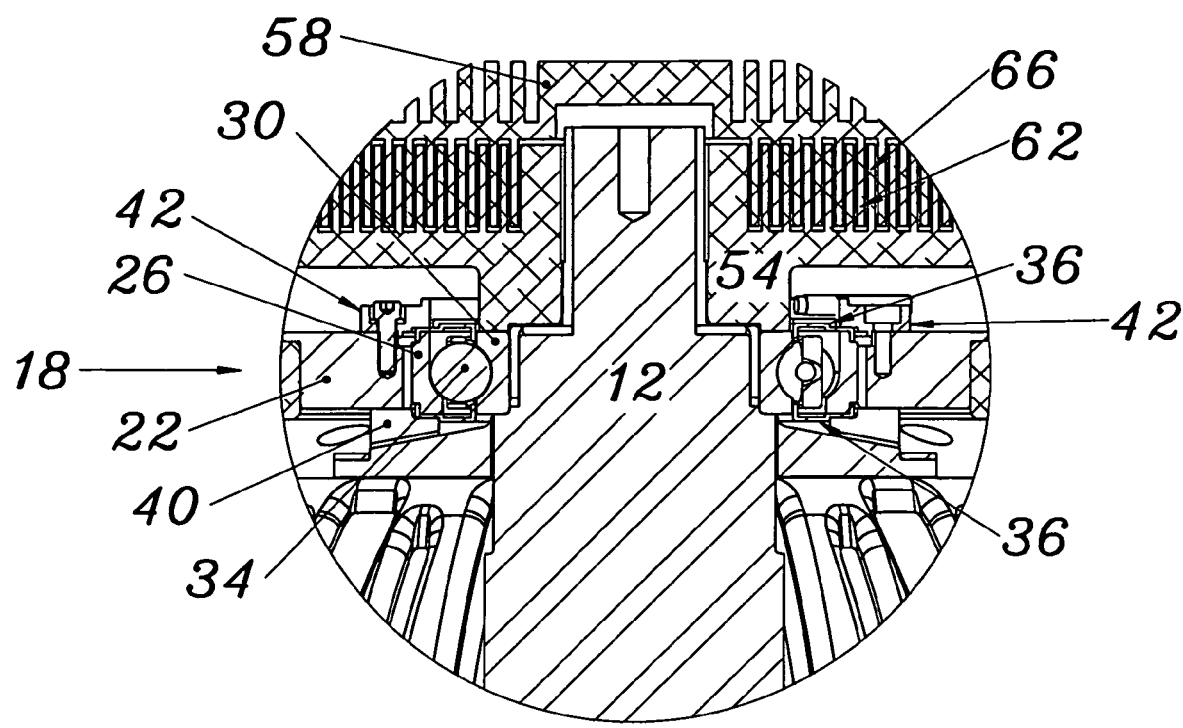
FIG. 2 is an enlargement of the upper bearing portion 2-2 of FIG. 1.
Figure 3:
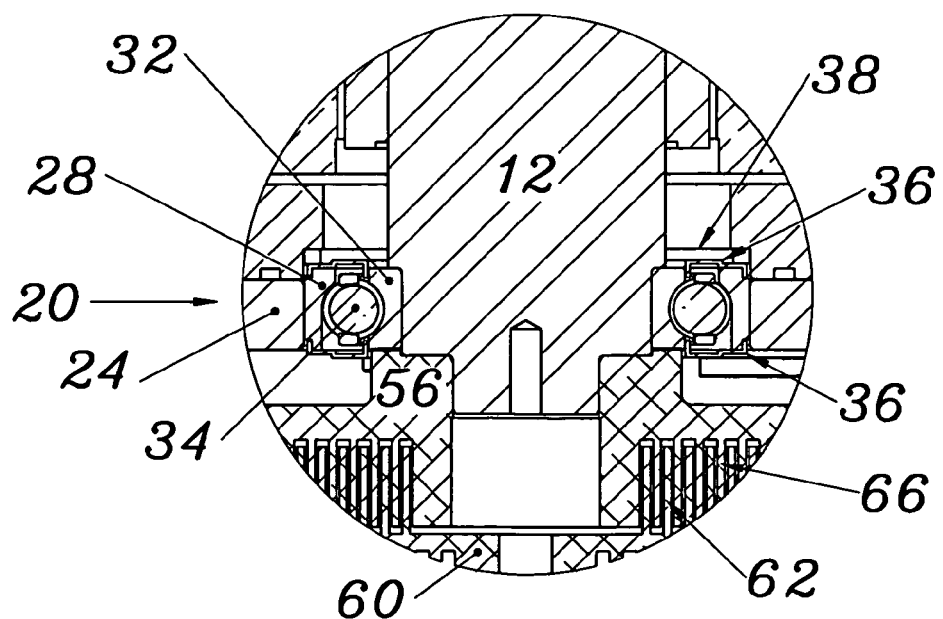
FIG. 3 is an enlargement of the lower bearing portion 3-3 of FIG. 1

As shown in the enlargements of FIGS. 2-3, each bearing assembly includes an outer housing 22, 24, outer race 26, 28, inner race 30, 32, and balls 34. Seals 36 are provided on both the top and bottom of each bearing. Upper and lower retainers 40, 42 hold the upper bearing in place. These bearings are lubricated by a grease pack.

Heat generated by the bearing inner races and electric motor rotor, is transferred to the exterior by cooling collar assemblies 50, 52 (one of many implementations of the heat transfer elements) located adjacent each bearing. Each cooling collar assembly includes an inner rotating collar 54, 56, and an outer stationary collar 58, 60 that also forms the enclosure end cap. Collars 54, 56, 58, 60 may be constructed of a variety of materials with good heat conductivity (e.g., aluminum, copper, or plastic).

Figure 4:
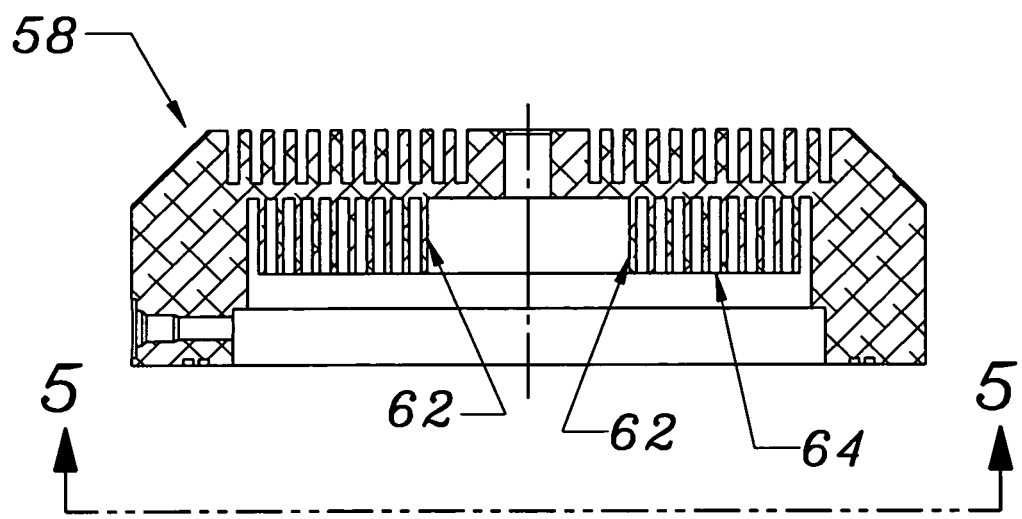
FIG. 4 is a cross-sectional view (taken along 4-4 in FIG. 5) through the outer heat transfer element of the implementation of FIG. 1.
Figure 5:
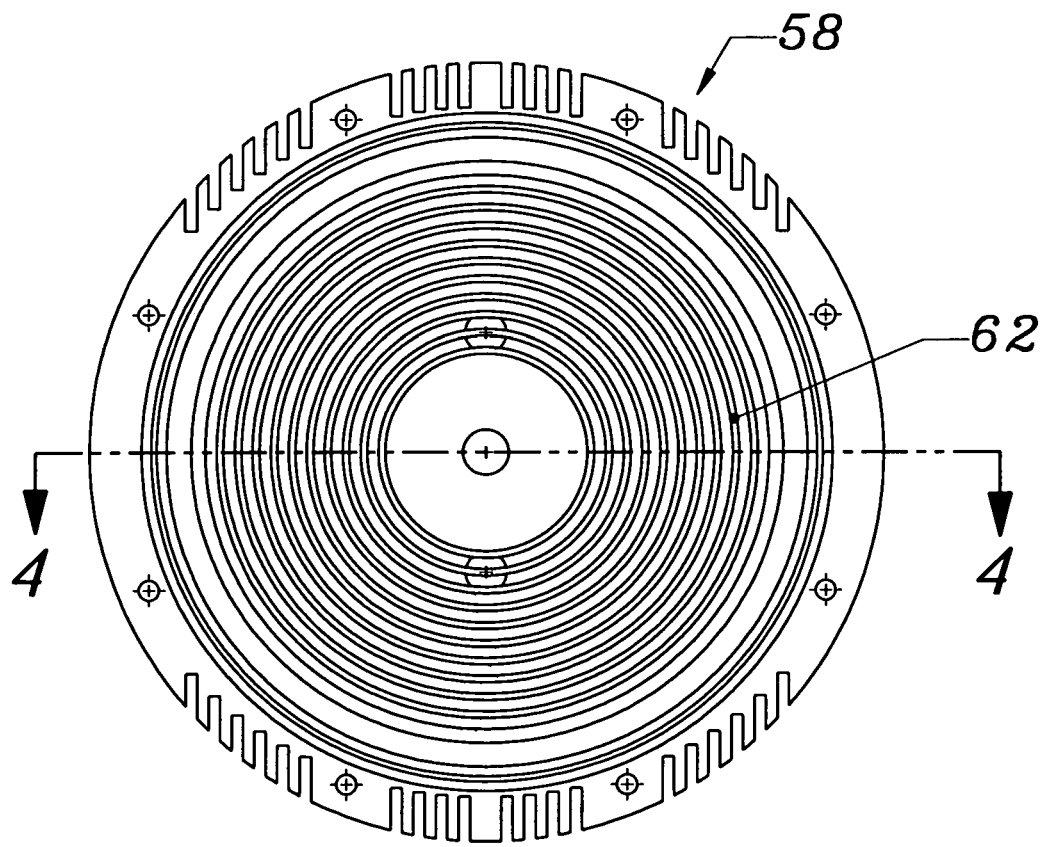
FIG. 5 is a plan view (taken along 5-5 in FIG. 4) looking up at the vanes of the heat transfer element of FIG. 4.

As shown in FIGS. 4-5, the outer collars 58, 60 have ten cylindrical vanes 62, each of a different radius. Cylindrical gaps 64 are formed between the vanes. The vanes are approximately 2.77 mm in radial thickness, and the radial separation between vanes (i.e., the radial width of the gaps) is approximately 4.78 mm. The vanes 62 are about 32 mm in length along the axial direction.

The inner collars 54, 56 have eleven cylindrical vanes 66 and cylindrical gaps 68 between the vanes (FIGS. 2-3), each of a different radius, and sized and positioned so that the vanes 66 mate with vanes 62 of the mating outer collars. Vanes 66 are approximately the same length (32 mm), width, and radial thickness as vanes 62, and are received in gaps 64 between vanes 62.

After inner and outer collars are mated, with vanes interleaved, the radial separation between a rotating vane from one collar and a stationary vane from another is approximately 1 mm. To improve heat transfer by gaseous conduction, this separation may be made as small as possible subject to practical limitations such as machining and operating tolerances.

In partial vacuum applications, the separation is typically not less than the mean free path of the gas molecules at the operating pressure. This small separation ensures that the gas thermal conductivity is not reduced by the vacuum pressure and assists heat transfer by gaseous convection.

In one implementation, the operating pressure is 1 Torr, the operating temperature is 100 C., and the molecular mean free path of air is 0.066 mm, which is significantly less that the 1 mm radial separation In practice, the distance may vary from these general guidelines so long as substantial heat is transferred across the separation.

Figure 6:
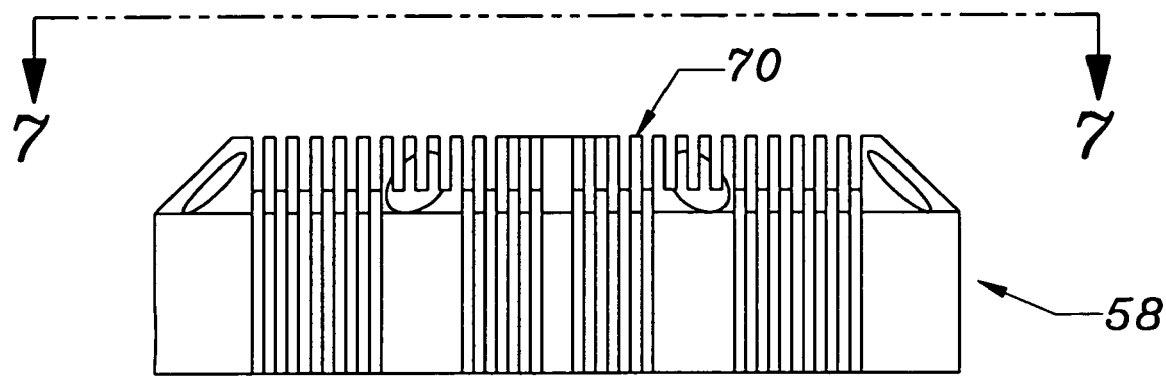
FIG. 6 is an elevation view of the heat transfer element of FIG. 4.
Figure 7:
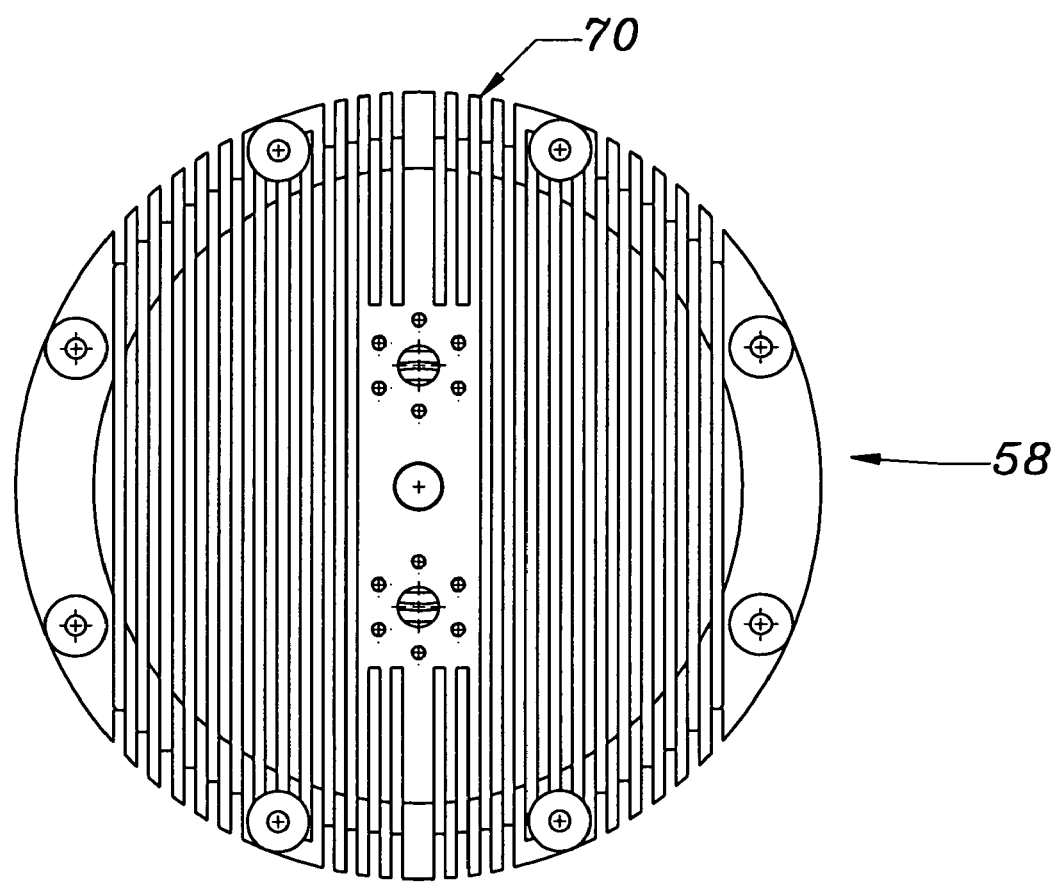
FIG. 7 is a plan view (taken along 7-7 in FIG. 6) looking down at the top surface of the heat transfer element of FIG. 4.
Figure 8:
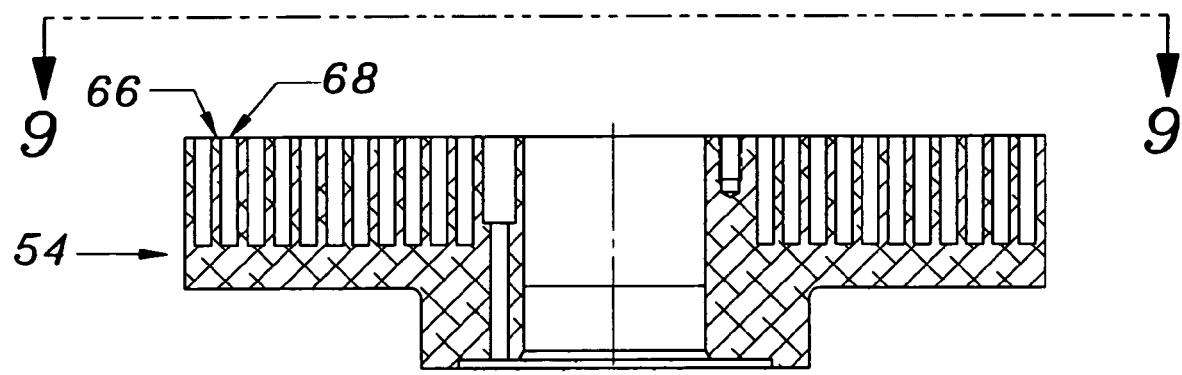
FIG. 8 is a cross-sectional view (taken along 8-8 in FIG. 9) through the inner heat transfer element of the implementation of FIG. 1
Figure 9:
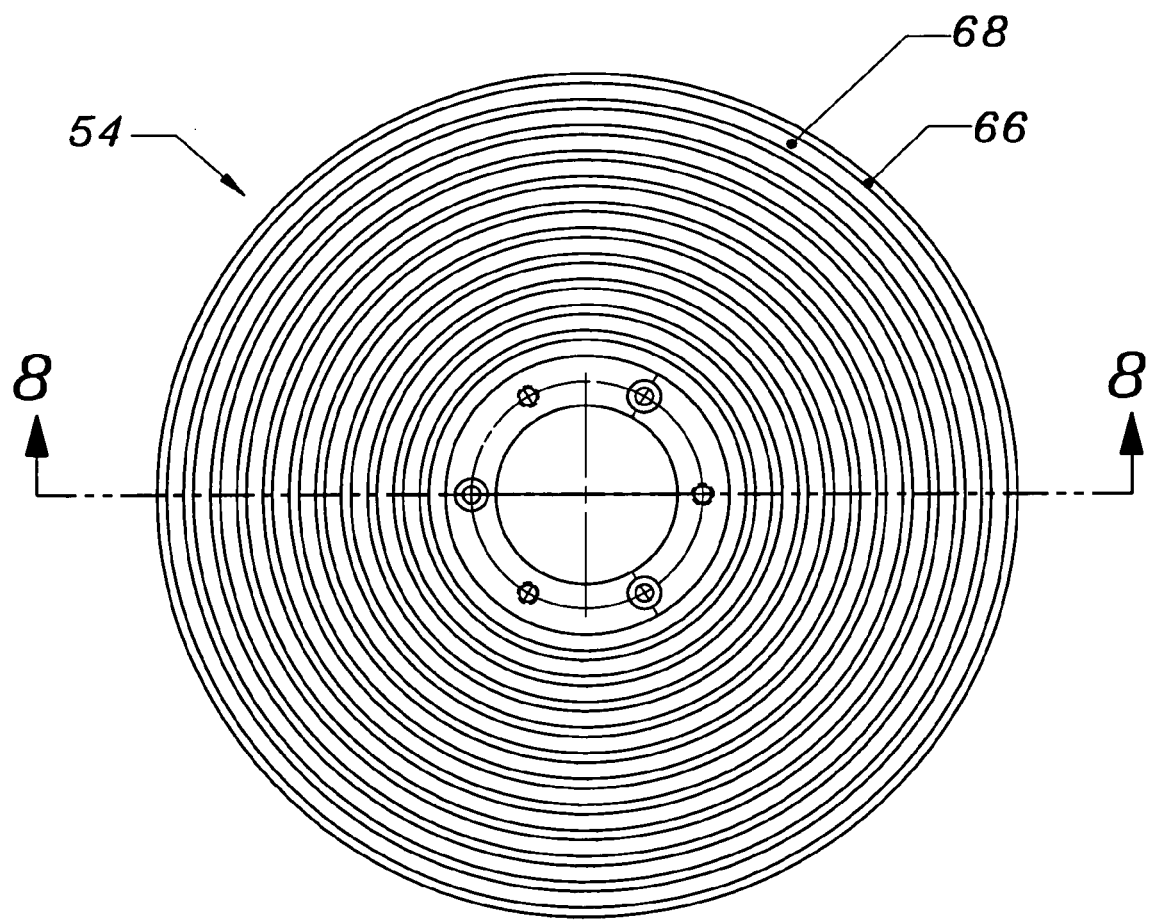
FIG. 9 is a plan view (taken along 9-9 in FIG. 8) looking down at the top surface of the inner heat transfer element of FIG. 8.

As shown in FIGS. 6-7, the exterior surfaces of outer collars 58, 60 have additional heat transfer vanes 70, which transfer heat from the collar to the surrounding atmosphere (by conduction at the surface of the vanes, with convection moving air past the vanes).

In the implementation shown, the rotating and stationary vanes 66, 62 each have a total surface area of 0.34 square meters. A typical temperature differential between the rotating and stationary vanes is 15 C., and air conduction alone will transfer 153 watts across the gap to cool the bearing inner race at this differential. If it is necessary to provide more cooling, the stationary vanes could be actively cooled by blowing air over them (outside the containment) to create a bigger temperature differential between the rotating and stationary vanes. A 30 C. temperature differential would transfer 306 watts by gaseous conduction alone. Alternatively, the amount of heat transfer could be increased by back filling the vacuum chamber with helium or hydrogen after the initial pump down. Helium's thermal conductivity is approximately 5.6 times that of air, and therefore a 15 C. temperature differential would transfer 855 watts of heat by gaseous conduction alone. If further increases in heat transfer were required the radial separation between the fixed and rotating vanes could be reduced from 1 mm to 0.5 mm. It is typically feasible to operate with that small a radial separation as machines like CMGs and flywheel energy storage devices are typically manufactured to very tight tolerances (less than 0.025 mm typically), and their flywheels are supported in very high precision rolling element bearings. If the flywheel is enclosed in helium at 1 Torr, the radial separation is 0.5 mm, and the temperature differential is 15 C., then 1710 watts of heat can be transferred from the bearing inner races by gaseous conduction alone. It is also possible to adjust the amount of heat transferred by increasing or decreasing the surface area of the vanes.

These examples show how the cooling method and apparatus can be adjusted to provide the amount of cooling that the heat generating components require in order to achieve stable operating temperatures. The designer can vary the vane area, radial separation, gas type, gas density and the temperature difference between the rotating and stationary vanes to get the optimum solution for a specific application.

FIGS. 10-14 show an implementation of the liquid cooling scheme. The liquid cooling implementation also depends on cooling collars on the rotating shaft adjacent to the primary source of heat, i.e., the inner race of the flywheel bearings. However, with liquid cooling, the fins on the collars consist of spaced planar disks extending radially outward from the shaft, and there are no mating fixed fins attached to the flywheel containment. Rather, cooling is accomplished by oil jets positioned on the containment outboard of the disks which squirt streams of oil between the rotating disks and toward the center of the flywheel shaft, thus conducting the heat from the disks to the oil, which is then flung by centrifugal force outward to be collected by an inner liner inside the containment but outside the perimeter of the flywheel. This, in turn, forces the hot oil to follow the inner curvature of the containment on its downward gravitational path, where it transfers the heat to the containment, aided by interior ridges on the containment which increase the surface area contacted by the oil. The oil is collected in a sump at the bottom of the device, where it is pumped back up to the oil jets, completing the cooling cycle.

Figure 10:
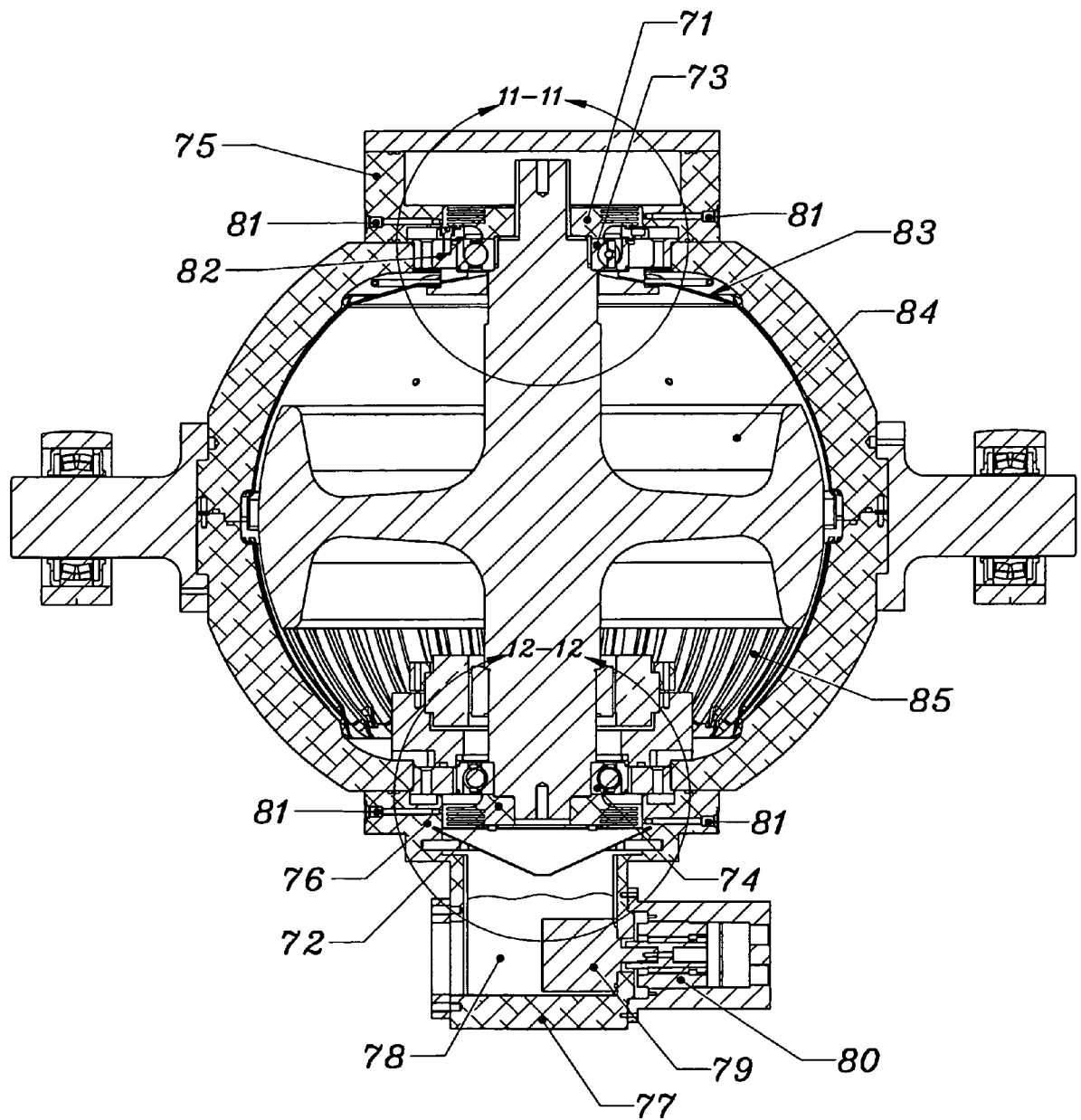
FIG. 10 is a cross-sectional view of a boat stability CMG incorporating a liquid cooling implementation of the second aspect of the invention.
Figure 11:
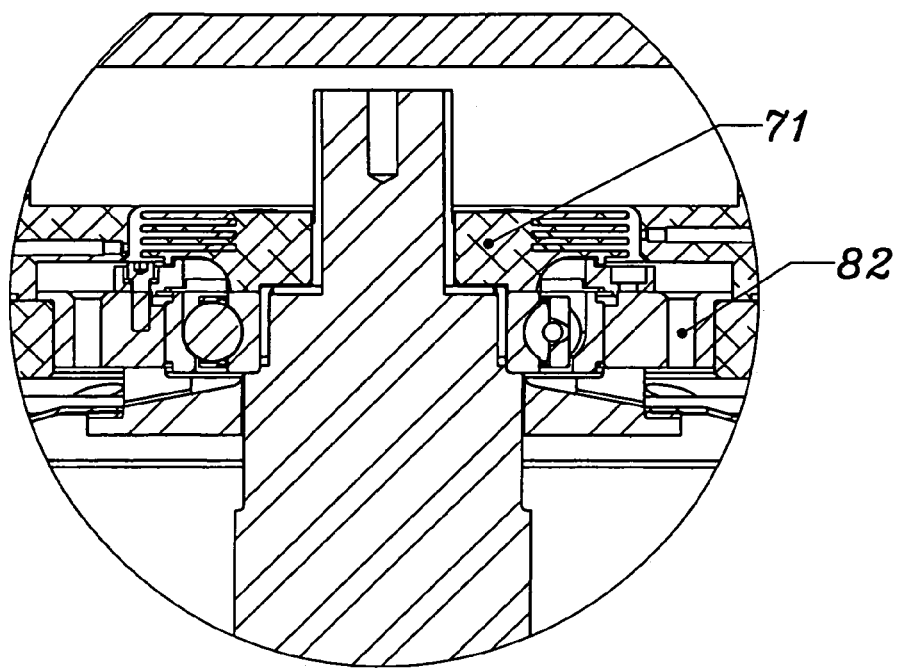
FIG. 11 is an enlargement of the upper bearing portion 11-11 of FIG. 10.
Figure 12:
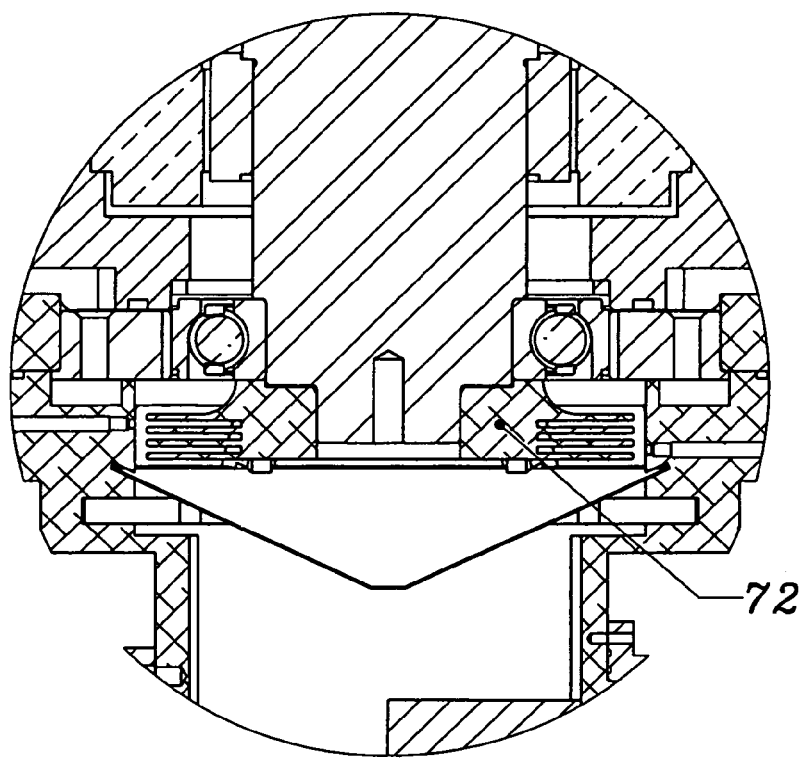
FIG. 12 is an enlargement of the upper bearing portion 12-12 of FIG. 10
Figure 13:
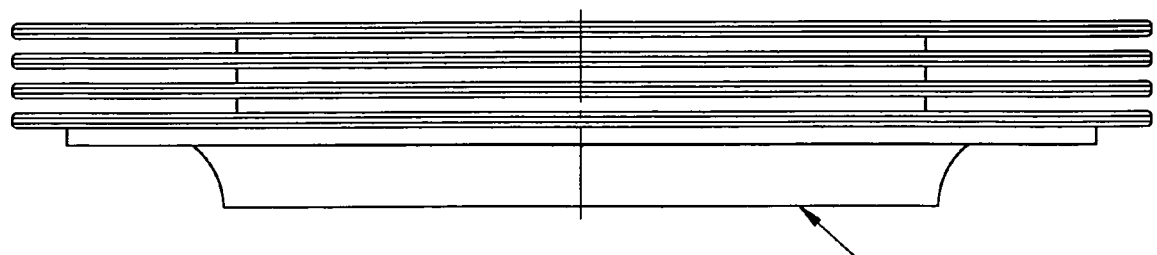
FIG. 13 is an elevation of the set of rotating vanes of the implementation of FIG. 10.
Figure 14:
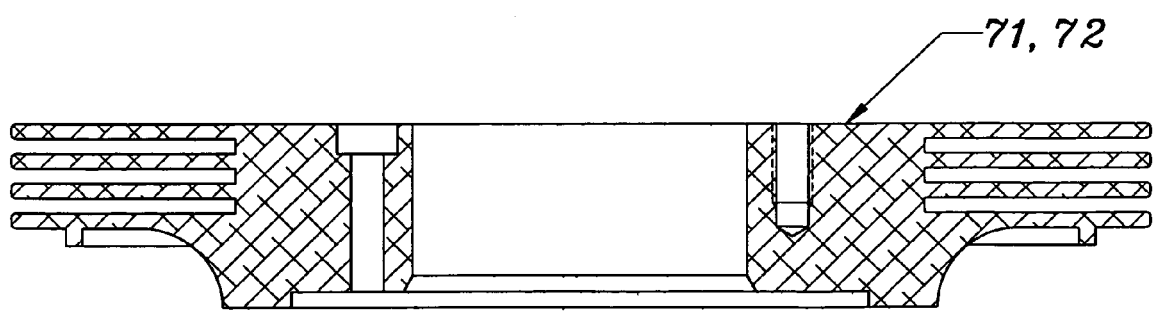
FIG. 14 is a cross-sectional view of the set of rotating vanes of FIG. 13.

Turning to FIG. 10, the heat generated by the bearing inner races and electric motor rotor, is transferred to upper and lower cooling collar assemblies 71, 72 located adjacent to the upper and lower bearing inner races 73, 74. In the case of the upper bearing, a stationary housing 75 surrounds the upper cooling collar and forms the enclosure end cap. In the case of the lower bearing, the stationary housing 76 surrounding the lower cooling collar is part of the oil reservoir assembly 77.

The reservoir assembly also contains the cooling oil 78, cooling pump 79, cooling pump motor 80, and a filter and valves (not shown). The cooling collar assemblies 71, 72 may be constructed of a variety of materials that have good thermal conductivity (e.g. aluminum and copper).

As shown in more detail in FIGS. 11-14, the cooling collar assemblies each have 4 horizontal vanes that form 3 gaps between the vanes. The inner radius of the gaps is 54 mm, the outer radius is 89 mm, and the width of the gaps is 2.4 mm. The upper and lower stationary housings that surround the cooling collars each contain 3 oil jets 81 (one per gap). These jets are mounted and oriented such that they spray a stream of cooling oil into and parallel to the gaps between the horizontal vanes. The jet orifice diameter is 0.64 mm where the stream exits.

The very thin stream of cooling oil contacts the bottom of each gap in the cooling collar vanes and is redirected by the high speed of rotation such that it creates a thin film that completely covers the vane surfaces before centrifugal forces throw the film off. The cooler oil film moving at high speed across the hotter vane surface picks up heat by conduction and carries it away by convection. The result is very efficient heat transfer from the inner race of the bearing to the cooling collar, and then to the cooling oil.

The heated oil exiting the upper collar vanes strikes the stationary housing 75, drops through holes in the bearing housing 82 and is collected by an inner liner 83 inside the containment but outside the perimeter of the flywheel 84. The liner is mounted to interior ribs of the containment 85 to increase the surface area in contact with the oil. This liner/rib arrangement forces the hot oil to follow the inner curvature of the containment on its downward gravitational path to the reservoir below the lower bearing. As the oil follows this contour, it transfers heat to the cooler containment, which steadily decreases the oil temperature until it reaches the reservoir 77.

There may also be a bypass oil flow that is sprayed on the containment between the ribs and liner just below the upper bearing. This bypass flow increases the amount of oil in contact with the containment and helps cool the oil in the reservoir.

The hot oil exiting the vanes of the lower collar 72 drops into the reservoir 77 without significant cooling. At any point in time, the reservoir contains a mix of oil from the upper collar that has been cooled by the containment, bypass oil that has been cooled by the containment, and oil from the lower collar that has not been cooled. The containment's internal and external surface areas and external cooling may be designed so that sufficient heat is extracted from the oil exiting the upper collar and from the bypass oil flow to cool the mix of oil in the reservoir. The oil in the reservoir is picked up by the pump and pumped back up to the oil jets and sprayed on the upper and lower collars and through the bypass jets, thus completing the cooling cycle.

This particular cooling collar implementation has a total vane surface area of 0.093 square meters in contact with oil. The oil pump delivers 0.5 liter per minute per collar or 0.165 liter per minute per jet. The temperature of the oil increases 15 deg C. (from its entry onto the vanes to its exit from the vanes) to transfer 250 watts of heat from the bearing inner race and maintain the inner race at a temperature in the range of 80-100 C.

Like the scheme of FIGS. 1-9, the liquid cooling scheme is flexible if it is necessary to provide more cooling. The cooling vane area, number of gaps/jets, and cooling flow rate can all be increased to increase the rate of heat transfer from the bearing inner races and motor to the containment. If the oil used for heat transfer is not sufficiently cooled by the containment, then forced air cooling can be applied to the exterior of the containment. Alternatively, the reservoir oil can be circulated through a dedicated oil/air or oil/water heat exchanger to extract more heat from the oil and further lower the oil's temperature prior to spraying it on the collars.

Additionally, in some very high-speed flywheel applications, it may be necessary to use oil instead of grease to lubricate the bearings. In these cases, the same oil used for heat transfer with the cooling collars can be used for lubricating the bearings. The amount of oil required to lubricate the bearings is very small. Therefore it can be delivered by a number of methods including jetting, micro dosing, wicking or by letting a small amount of the oil exiting the collar vanes enter the bearing.

Many other implementations other than those described above are within the invention, which is defined by the following claims. As mentioned earlier, it is not possible to describe here all possible implementations of the invention, but a few possibilities not mentioned above include the following:

Implementations of the first aspect of the invention may include multiple vane or collar assemblies installed on a single shaft to cool a number of heat generating components or improve cooling of one component. Gases which have higher thermal conductivities and specific heats than air (e.g. helium and hydrogen) may be used to improve the heat transfer in partial vacuum and enclosed applications. The vane assemblies may be constructed of good heat conducting metals (such as copper and aluminum) or thermally conductive plastics.

Gaseous conduction and convective cooling may be provided by keeping the gap between the flywheel and its enclosure very small, thereby permitting heat to flow from the flywheel rim and/or disc to the cooler enclosure. This arrangement may provide a second path of heat transfer or it may be the principal heat transfer path.

Liquid cooling implementations may include multiple vane or collar assemblies installed on a single shaft to cool a number of heat generating components or improve cooling of one component. If oil is used as the coolant fluid, it can also be used to lubricate the bearings. The vane assemblies may be constructed of good heat conducting metals (such as copper and aluminum) or thermally conductive plastics. The fluid used for cooling could be oil, water, or a heat transfer fluid.

Both the first and second aspects of the invention will work in a pressured environment, at ambient pressure, or in a partial vacuum.

As used in the claims, when an element is said to be "attached to" another element that includes the case of there being one or more intermediate elements between the elements, as well as the case in which the elements are in direct contact.

Not all of the features described above and appearing in some of the claims below are necessary to practicing the invention. Only the features recited in a particular claim are required for practicing the invention described in that claim. Features have been intentionally left out of claims in order to describe the invention at a breadth consistent with the inventors' contribution. For example, although in some implementations, interleaved vanes are used to transfer heat, such interleaved vanes are not required to practice the invention of other claims. Although in some implementations, liquid coolant is circulated over vanes, liquid coolant is not required to practice the invention of other claims.

What is claimed is:

1. Cooling apparatus for transferring heat from and cooling one or more heat generating components that support or drive a flywheel or other spinning member; the apparatus comprising:
    an enclosure enclosing the spinning member, the enclosure containing a gas at below-ambient pressure or below-ambient density;
    a first plurality of vanes attached to the spinning member such that the first plurality of vanes spin with the spinning member relative to the enclosure;
    a second plurality of vanes fixed relative to the enclosure and the spinning member such that the first vanes move with respect to the second vanes, the second vanes defining gaps into which the first vanes extend so that the first and second vanes are interleaved; and
    wherein:
        the first and second vanes are located adjacent a bearing that supports the spinning member,
        the bearing has an inner race and an outer race,
        the first vanes and inner race are attached to the spinning member so heat flows by conduction from the inner race to the first vanes and from the spinning member to the first vanes,
        the outer race is attached to the enclosure, and
        the inner race, spinning member, first vanes and second vanes are sized and positioned so that heat from the inner race of the bearing flows by solid conduction from the inner race to the spinning member and to the first vanes, by solid conduction from the spinning member to the first vanes, and by gaseous conduction and convection from the first vanes to the second vanes, and by solid conduction from the second vanes to the exterior of the enclosure.

2. The apparatus of claim 1 wherein heat transfer between the first and second vanes is primarily by gaseous conduction.

3. The apparatus of claim 1 wherein the first and second vanes have closely spaced exposed surfaces across which heat is transferred.

4. The apparatus of claim 1 wherein the separation between the first vanes and second vanes is greater than 0.025 mm but less than 10 mm.

5. The apparatus of claim 1 wherein the gas is both below-ambient pressure and below-ambient density.

6. The apparatus of claim 1 wherein the spinning member is a flywheel and the flywheel and enclosure are part of gyroscopic roll stabilizer for a boat.

7. The apparatus of claim 1 further comprising a heat sink to which heat flows from the second vanes.

8. The apparatus of claim 7 wherein the heat sink comprises air-cooled fins on the exterior of the enclosure.

9. The apparatus of claim 1 wherein the gas has a molecular mean free path equal to or less than the distance between the first and second vanes.

10. The apparatus of claim 1 wherein the gas has a higher thermal conductivity than air.

11. Cooling apparatus for transferring heat from and cooling one or more heat generating components that support or drive a flywheel or other spinning member; the apparatus comprising:

an enclosure enclosing the spinning member, the enclosure containing a gas at below-ambient pressure or below-ambient density, wherein an axis of rotation about which the spinning member spins defines an axial direction;

a first plurality of vanes attached to the spinning member such that the first plurality of vanes spin with the spinning member relative to the enclosure, wherein the first vanes are cylindrical elements extending in a first direction substantially parallel to the axial direction;

a second plurality of vanes fixed relative to the enclosure and the spinning member such that the first vanes move with respect to the second vanes, wherein the second vanes are cylindrical elements extending in a second direction substantially parallel to the axial direction and opposite the first direction, the second vanes defining cylindrical shaped channels into which the first vanes extend so that the first and second vanes are interleaved; and wherein the first and second vanes are positioned in close proximity to one another so that substantial heat is transferred from the first vanes to the second vanes and the second vanes are configured such that that heat can be readily transferred from the second vanes to the exterior of the enclosure.

12. The apparatus of claim 11 wherein heat transfer between the first and second vanes occurs both by gaseous conduction and convection.

13. The apparatus of claim 12 wherein heat transfer between the first and second vanes is primarily by gaseous conduction.

14. The apparatus of claim 12 wherein the first and second vanes have closely spaced exposed surfaces across which heat is transferred.

15. The apparatus of claim 14 wherein the separation between the first vanes and second vanes is greater than 0.025 mm but less than 10 mm.

16. The apparatus of claim 11 wherein the gas is both below-ambient pressure and below-ambient density.

17. The apparatus of claim 11 wherein the spinning member is a flywheel and the flywheel and enclosure are part of gyroscopic roll stabilizer for a boat.

18. The apparatus of claim 11 further comprising a heat sink to which heat flows from the second vanes.

19. The apparatus of claim 18 wherein the heat sink comprises air-cooled fins on the exterior of the enclosure.

20. The apparatus of claim 11 wherein the gas has a molecular mean free path equal to or less than the distance between the first and second vanes.

21. The apparatus of claim 11 wherein the gas has a higher thermal conductivity than air.

22. The apparatus of claim 11 wherein the heat generating component comprises one or more bearings.

23. The apparatus of claim 11 wherein the heat generating component comprises one or more electrical motors.

\* \* \* \* \*

UNITED STATES PATENT AND TRADEMARK OFFICE
CERTIFICATE OF CORRECTION

| | | |
|---|---|---|
| PATENT NO. | : 7,546,782 B2 | Page 1 of 1 |
| APPLICATION NO. | : 11/330896 | |
| DATED | : June 16, 2009 | |
| INVENTOR(S) | : John D. Adams | |

It is certified that error appears in the above-identified patent and that said Letters Patent is hereby corrected as shown below:

Column 11, line 31, in claim 11 delete 2$^{nd}$ "that" and insert --the--.

Signed and Sealed this

Sixth Day of October, 2009

David J. Kappos
*Director of the United States Patent and Trademark Office*